United States Patent Office 2,996,490
Patented Aug. 15, 1961

2,996,490
SUSPENSION POLYMERIZATION PROCESS AND NOVEL COMPOUNDS FOR USE IN SAID PROCESS
George P. Rowland, Pottstown, and John J. Wolski, Springfield, Pa., assignors to The Firestone Tire & Rubber Company, Akron, Ohio, a corporation of Ohio
No Drawing. Filed May 12, 1959, Ser. No. 812,575
8 Claims. (Cl. 260—92.8)

This invention relates to the suspension polymerization of vinyl chloride to yield resins having good dry plasticizer blending properties and good electrical properties, and also to certain novel metallic salts of alkyl beta-imino dipropionic acid for use in said process.

Vinyl chloride resin compositions are generally made up by initially mixing the granular resin, liquid plasticizers, stabilizer, pigments, etc. in a ribbon or blade-type mixer until a uniform, granular, free-flowing blend results. The blend is then transferred to fusing and hot-working machinery such as roll mills, Banbury mills, extruders, calenders and the like for working up into the final desired resin products. It is highly desirable that a resin so processed shall have the property, during the initial mixing stage, of rapidly taking up the liquid plasticizer so that the resin appears macroscopically "dry," the liquid plasticizer being completely absorbed into the pores of the resin granules. If this state is not achieved during the preliminary mixing, considerable difficulties will be encountered in subsequent processing. Any plasticizer not absorbed into the resin lubricates the granules so that they are not efficiently homogenized in the hot-working machinery, which results in excessive power consumption and in "fish-eyes" and other discontinuities in the finished products. Very few resins on the market at present have good plasticizer absorption performance as above outlined.

Accordingly, it is an object of this invention to provide a novel process for the production of vinyl chloride resins having excellent plasticizer absorption characteristics.

Another object is to provide such a process in which use is made of the available suspension polymerization apparatus and techniques.

A further object is to provide new chemical compounds for use in the process above outlined.

SYNOPSIS OF THE INVENTION

The above and other objects are secured, in accordance with this invention in a process in which vinyl chloride, or a mixture thereof with other unsaturated compounds copolymerizable therewith, is polymerized in aqueous suspension in the presence of certain bivalent metal salts of alkyl beta-imino dipropionic acids having the formula

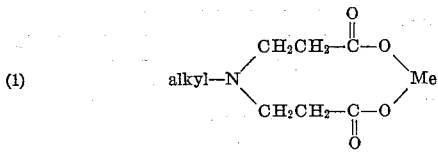

wherein: alkyl represents an alkyl group of from 8 to 16 carbon atoms, and Me represents a metal atom which may be barium, strontium, calcium, zinc or tin.

The resins so produced have excellent plasticizer-absorption properties.

THE ALKYL BETA-IMINO DIPROPIONIC ACID SALTS

Referring to Formula 1 above, by far the preferred metallic component "Me" for these compounds is barium, followed by strontium, calcium, zinc and tin in decreasing order of preference. With respect to the radical "alkyl," the preferred and most convenient radical is the n-dodecyl radical, the alkyl beta-imino dipropionic acid corresponding to this value being conveniently available as "lauryl beta-imino dipropionic acid," in which the "lauryl" groups are the mixed radicals containing principally dodecyl radicals but also some higher (e.g. tetradecyl) and lower (e.g. octyl and decyl) radicals, derived by the reduction of coconut oil fatty acids. The compounds are readily prepared by reacting, in aqueous solution, the sodium, ammonium, or other water-soluble salt (2) of an alkyl beta-imino dipropionic acid with a chloride or other water-soluble salt of barium, strontium, calcium, zinc or tin, the following reaction taking place:

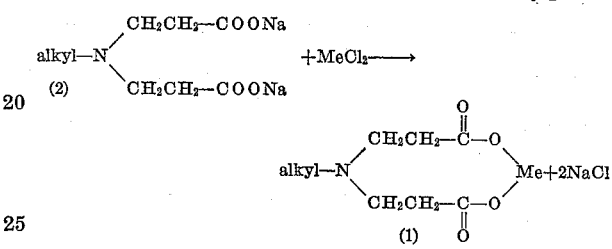

The desired insoluble salt is recovered by filtration, centrifugation and the like. Specific exemplary compounds under Formula 1 above are barium dodecyl beta-imino dipropionate, strontium dodecyl beta-imino dipropionate, calcium dodecyl beta-imino dipropionate, zinc dodecyl beta-imino dipropionate, stannous dodecyl beta-imino dipropionate, barium tetradecyl beta-imino dipropionate, barium decyl beta-imino dipropionate, barium 2-ethyl hexyl beta-imino dipropionate, strontium decyl beta-imino dipropionate, stannous tetradecyl beta-imino dipropionate, and the like. It will be understood that mixtures of two or more compounds individually coming under Formula 1 are also contemplated, for instnace, mixtures of compounds under the Formula 1 above in which the alkyl groups are derived from commercial mixtures of alkylating constituents, for instance the mixed alkyl radicals contained in the alcohols derived by the reduction of the mixtures of fatty acids occurring in natural glycerides such as coconut oil, the mixed radicals derived by dimerization and trimerization of propylene and butylene, oxo process alcohols and so on. Likewise mixtures of salts of different metals, for instance, mixtures of barium and strontium salts, may be used.

THE POLYMERIZATION

In general, the process of this invention follows the ordinary suspension polymerization procedure, with the exception that the compound of Formula 1 is present. The suspension polymerization process consists in agitating the vinyl chloride monomer in an aqueous medium containing a non-micelle-forming protective colloid sespending agent. Suspending agents suitable for this purpose are hydrophilic high polymeric materials such as gelatin, starch, carragheen, albumen, agar-agar, gum tragacanth, polyvinyl alcohol, polyacrylic acid, polymaleic acid, methyl cellulose, and the like. The aqueous medium constitutes about at least half the entire polymerization mass. The reaction is promoted by the presence of free-radical-generating agents soluble in the monomer phase of the suspension, such as benzoyl peroxide, perbenzoic acid, lauroyl peroxide, p-chlorobenzoyl peroxide, t-butyl hydroperoxide, and the like. In the practice of the present invention, there will further be present a salt in accordance with Formula 1 above. The aqueous phase and the monomer phase are agitated together so as to suspend the latter in the former without, however, forming a permanent emulsion, and the temperature of the mass adjusted to values such as to initiate the polymerization reaction, usually on the order of 30°–100° C. The monomers in the suspended droplets become polymerized, yielding a suspension of granular resin in the aqueous medium. From this aqueous suspension the resin is isolated by filtration. The amount of the compound (1) used in the polymerization mass will generally be upwards of .05%, and preferably upwards of 1.0%, based on the weight of the monomers in the system. The upper limit for this concentration is not critical; as high as 10% could be added without adverse effect, so far as the operativeness of the process is concerned. However, amounts in excess of 3% will usually be unnecessary and wasteful from an economic point of view.

It will be understood that the monomeric compositions polymerized according to this invention may be either unmixed vinyl chloride or mixtures thereof with minor proportions, say not over 20%, based on the weight of said mixtures, of one or more other ethylenically unsaturated compounds copolymerizable with vinyl chloride. Conversely stated, the mixtures should contain at least 80% vinyl chloride by weight. Ethylenically unsaturated compounds copolymerizable with vinyl chloride are exemplified in vinyl esters on the order of vinyl bromide, vinyl fluoride, vinyl acetate, vinyl chloroacetate, vinyl butyrate, other fatty acid vinyl esters, vinyl alkyl sulfonates and the like; vinyl ethers such as vinyl ethyl ether, vinyl isopropyl ether, vinyl chloroethyl ether and the like; cyclic unsaturated compounds such as styrene, the mono- and polychlorostyrenes, coumarone, indene, vinyl naphthalenes, vinyl pyridines, vinyl pyrrole and the like; acrylic acid and its derivatives such as ethyl acrylate, methyl methacrylate, ethyl methacrylate, ethyl chloroacrylate, acrylonitrile, methacrylonitrile, diethyl maleate, diethyl fumarate, and the like; vinylidene compounds on the order of vinylidene chloride, vinylidene bromide, vinylidene fluorochloride, and the like; allyl compounds such as allyl acetate, allyl chloride, allyl ethyl ether and the like; and conjugated and cross-conjugated ethylenically unsaturated compounds such as divinyl ketone and the like. For a fairly complete list of materials known to polymerize with vinyl chloride, reference may be had to Krczil, "Kurzes Handbuch der Polymerisations-Technik–II Mehrstoff Polymerization," Edwards Bros. Inc., 1945, pp. 735–747, the items under "Vinyl chlorid."

THE RESINS PRODUCED IN ACCORDANCE WITH THIS INVENTION

The resins produced in accordance with this invention have the property of rapidly imbibing liquid plasticizers of all conventional types in the preliminary mechanical mixing. Microscopically examined, the resin granules will be found to be generally spherical, and of rather narrow distribution of particle diameters, usually on the order of 150–350 microns.

With the foregoing general discussion in mind, there are given herewith detailed specific examples of the practice of this invention.

*Example I*

| | Grams |
|---|---|
| Vinyl chloride | 60 |
| Water | 120 |
| Lauroyl peroxide | 0.2 |
| Gelatin (100 Bloom) | 0.4, 0.5, 0.6 or 0.8 |
| Barium lauryl[1] beta-imino dipropionate | 0.11, 0.13, 0.15 or 0.17 |

[1] The "lauryl" substituent is a mixture of alkyl radicals derived from the alcohols produced by the reduction of the mixed fatty acids of coconut oil; predominantly dodecyl groups and tetradecyl groups.

A series of runs was made in accordance with the foregoing recipe, using each possible combination of amounts of gelatin and of barium lauryl beta-imino dipropionate in the several runs. In each run, the ingredients, other than vinyl chloride, were charged into a 12-ounce beverage bottle and mixed. The vinyl chloride, slightly in excess of the recipe amount, was next charged and allowed to vaporize to purge the free space in the bottle and to reduce the weight of vinyl chloride to the amount in the recipe. The bottle was then capped and tumbled in a water bath at 25° C. for one hour, after which it was tumbled in a water bath at 50° C. for 18 hours. At the end of this period, the bottle was vented and opened, and the polymer was separated from the suspension medium by filtration, washed on the filter with distilled water, and dried. The resultant polymer in every case had excellent plasticizer-absorbing properties, as observed on a microscope slide. This observation was made by placing a small quantity of the resin in a thin layer on a microscope slide, adding a drop of dioctyl phthalate, and placing the slide on the microscope stage. The resin particles could be seen in the microscope to rapidly imbibe the dioctyl phthalate. The particle size and shape were very uniform, the particles being predominantly 280 microns in diameter and spherical, and the resin was free from fine and from coarse grains.

*Example II.—Various metal salts*

| | Grams |
|---|---|
| Vinyl chloride | 60 |
| Water | 120 |
| Lauroyl peroxide | 0.1 |
| Gelatin (100 Bloom) | 0.5 |
| Calcium, strontium, stannous or zinc neutral salt of lauryl[1] beta-imino dipropionic acid | 0.11 to 0.18 |

[1] The "lauryl" substituent is a mixture of alkyl radicals derived from the alcohols produced by the reduction of mixed fatty acids of coconut oil; predominanly dodecyl groups and tetradecyl groups.

A series of runs was made in accordance with the foregoing recipe, using the various salts of the imino acid in amounts over the range indicated. Each run was conducted in accordance with the procedure of Example I. Good resins from the standpoint of plasticizer-absorption were obtained in all cases. The optimum ranges for the amount of the salts used, together with the characteristics of the products, are tabulated herewith.

TABLE I

| Anion | Optimum Range in Recipe (grams) | Description of Product | Heat Stability (minutes, determined) as in Example III |
|---|---|---|---|
| Calcium | 0.13–0.17 | Shaggy spheres 175μ in diameter. | 75 |
| Strontium | 0.13–0.17 | Irregular spheres 310μ in diameter. | 65 |
| Tin | 0.13–0.17 | Irregular spheres 140μ in diameter. | 45 |
| Zinc | 0.11–0.17 | Irregular spheres 140μ in diameter. | 60 |

*Example III.—Large scale run*

| | Pounds |
|---|---|
| Vinyl chloride | 100 |
| Water | 200 |
| Lauroyl peroxide | 0.28 |
| Gelatin (type B–100 Bloom) | 0.50 |
| Barium lauryl beta-imino dipropionate[1] | 0.20 |

[1] The "lauryl" substituent is a mixture of alkyl radicals derived from the alcohols produced by the reduction of the mixed fatty acids of coconut oil; predominantly dodecyl groups and tetradecyl groups.

A glass-lined steel autoclave provided with an anchor agitator and with a heating and cooling jacket was provided for the run. All ingredients except the monomer were charged first. The reactor was then closed, and the free space therein purged twice with vinyl chloride vapor followed by evacuation. The recipe amount of vinyl chloride was then charged, agitation commenced, and the temperature raised to 125° F., these conditions being maintained for 19 hours. At the end of this time the unreacted vinyl chloride was vented, and the reaction mass cooled to 25° C. and discharged. The polymerized vinyl chloride was recovered by filtration, washed on the filter with water, and dried. Following are the properties of the product.

TABLE II

Relative viscosity (1% solution in cyclohexanone at 25° C.) _____ 2.52.
Fisheye rating _____ 2 at 3 min.
Heat stability (peanut oil—180° C.) _____ Failure in 75 min.
Bulking density (gms./cc.) _____ 0.44.
Dry time _____ 8 min.
Hot flow _____ 3 min.
Screen analysis (percent retained):
  20 mesh _____ 0%.
  40 mesh _____ 0%.
  60 mesh _____ 0.4%.
  80 mesh _____ 1.0%.
  100 mesh _____ 92.0%.
  140 mesh _____ 3.6%.
  200 mesh _____ 1.8%.
  325 mesh _____ 0.2%.
  Percent thru 325 mesh _____ 1.0%.

The properties, other than conventional ones, tabulated above were determined as follows:

Heat stability:                                   Grams
  Resin _____ 100
  Dioctyl phthalate _____ 45
  Co-precipitated barium-cadmium laurate _____ 1
  Dibutyltin dilauryl mercaptide _____ 0.5

The above recipe was sheeted out on a laboratory mill at 310° F. Test strips were cut from this milled sheet and immersed in a peanut oil bath maintained at 180° C. Individual strips were removed at predetermined time intervals to study color degradation. The time at which a specimen removed had changed to dark brown was considered to be the failure time.

Fisheye rating:
  Resin _____ 100
  Dioctyl phthalate _____ 60
  Dibutyltin dilauryl mercaptide _____ 3

The above ingredients are milled together at 310° F. for 3 minutes, and then sheeted out as a film 13-17 mils in thickness. An 8-square inch specimen of the film is cut out, and the number of fisheyes counted and taken as an inverse measure of the rapidity with which the resin takes up the dioctyl phthalate plasticizer.

Day drier hot flow and dry time:                  Grams
  Resin _____ 400
  Dioctyl phthalate _____ 200
  Dibutyltin dilauryl mercaptide _____ 12

A "Day Mixer," which is a steam jacketed double-arm mixer with a capacity of 0.13 cubic feet with two tangential arms rotating at 36 and at 36 and 74 r.p.m. respectively, was employed in the test. Jacket temperature was adjusted to 330° F., but the temperature drifted downwardly during the test, so that the average temperature was about 210° F. The ingredients of the recipe were added cold to the hot mixer over a period of two minutes. Thereafter the progress of the mixing was watched, and the time at which the mixture fell free from the blades taken as the "Hot Flow" time. Likewise, small samples were removed at one-minute intervals and spread and pressed between sheets of paper in an unheated laboratory press under a pressure of 138 p.s.i. The length of time in the mixer required before a sample of the resin produced no stain on the paper was taken as the "Dry Time," and is considered to be an inverse measure of desirable absorption behavior.

The salts of the lauryl beta-imino dipropionic acids used in the foregoing experiments were prepared as follows.

A
Sodium-lauryl beta-imino dipropionate
  "Deriphat 160" a product of General Mills Corp.) _____ 373 g. (1 mol).
Water (de-ionized) _____ 1 liter.

B
Barium chloride _____ 209 g. (1 mol).
  or
Calcium chloride _____ 111 g. (1 mol).
  or
Strontium chloride _____ 159 g. (1 mol).
  or
Stannous chloride _____ 190 g. (1 mol).
  or
Zinc chloride _____ 137 g. (1 mol).
Water _____ 500 ml.

A series of preparations was made in accordance with the above recipe, using the calcium, strontium, barium, stannous and zinc chlorides individually in the several runs. In each run, the ingredients at "A" were placed in a three-gallon crock provided with a propeller-type agitator, and agitated together until complete solution was achieved. The selected salt and water listed at "B" were made up into a solution, and slowly added to the solution of the ingredients "A" with continued stirring. A precipitate quickly formed, and the resultant slurry stirred for an additional five minutes after the last of the ingredients "A" had been added. The slurry was then filtered, and the precipitate thoroughly washed on the filter with water. The precipitate was then sucked as dry as possible on the filter. The precipitate was then dried in a circulating hot-air oven at 200° F. for 24 hours. Substantially quantitative yields were obtained in every case.

The novel salts of the alkyl beta-imino dipropionic acids employed in the process of this invention are being separately claimed in a divisional application Serial No. 88,280, filed February 10, 1961.

What is claimed is:
1. Process for polymerizing a monomeric substance selected from the group consisting of vinyl chloride and mixtures thereof with up to 20%, based on the weight of the mixtures, of other ethylenically unsaturated compounds copolymerizable therewith which comprises suspending, agitating and polymerizing said monomeric substance in a reaction mass comprising an aqueous solution of a protective colloid, a peroxide catalyst soluble in said monomeric substance and at least 0.05%, based on the weight of said monomeric substance, of a salt selected from the class consisting of the barium, strontium, calcium, tin and zinc neutral salts of alkyl beta-imino dipropionic acids in which the alkyl groups contain from 8 to 16 carbon atoms.

2. Process for polymerizing a monomeric substance selected from the group consisting of vinyl chloride and mixtures thereof with up to 20%, based on the weight of the mixtures, of other ethylenically unsaturated compounds copolymerizable therewith which comprises suspending, agitating and polymerizing said monomeric substance in a reaction mass comprising an aqueous solution of a protective colloid, a peroxide catalyst soluble in said monomeric substance and from 1.0% to 3.0%, based on the weight of said monomeric substance, of baruim lauryl beta-imino dipropionate.

3. Process for polymerizing a monomeric substance selected from the group consisting of vinyl chloride and mixtures thereof with up to 20%, based on the weight of the mixtures, of other ethylenically unsaturated compounds copolymerizable therewith which comprises suspending agitating and polymerizing said monomeric substance in a reaction mass comprising an aqueous solution of a protective colloid, a peroxide catalyst soluble in said monomeric substance and from 1.0% to 3.0%, based on the weight of said monomeric substance, of strontium lauryl beta-imino dipropionate.

4. Process for polymerizing a monomeric substance selected from the group consisting of vinyl chloride and mixtures thereof with up to 20%, based on the weight of the mixtures, of other ethylenically unsaturated compounds copolymerizable therewith which comprises suspending, agitating and polymerizing said monomeric substance in a reaction mass comprising an aqueous solution of a protective colloid, a peroxide catalyst soluble in said monomeric substance and from 1.0% to 3.0%, based on the weight of said monomeric substance, of calcium lauryl beta-imino dipropionate.

5. Process for polymerizing a monomeric substance selected from the group consisting of vinyl chloride and mixtures thereof with up to 20%, based on the weight of the mixtures, of other ethylenically unsaturated compounds copolymerizable therewith which comprises suspending, agitating and polymerizing said monomeric substance in a reaction mass comprising an aqueous solution of a protective colloid, a peroxide catalyst soluble in said monomeric substance and from 1.0% to 3.0%, based on the weight of said monomeric substance, of zinc lauryl beta-imino dipropionate.

6. Process for polymerizing a monomeric substance selected from the group consisting of vinyl chloride and mixtures thereof with up to 20%, based on the weight of the mixtures, of other ethylenically unsaturated compounds copolymeriazable therewith which comprises suspending, agitating and polymerizing said monomeric substance in a reaction mass comprising an aqueous solution of a protective colloid, a peroxide catalyst soluble in said monomeric substance and from 1.0% to 3.0%, based on the weight of said monomeric substance, of tin lauryl beta-imino dipropionate.

7. Process of polymerizing vinyl chloride which comprises suspending, agitating and polymerizing vinyl chloride in a reaction mass comprising an aqueous solution of a protective colloid, a peroxide catalyst soluble in said vinyl chloride and from 1.0% to 3.0%, based on the weight of said vinyl chloride, of barium lauryl beta-imino dipropionate.

8. Process of polymerizing vinyl chloride which comprises suspending, agitating and polymerizing vinyl chloride in a reaction mass comprising an aqueous solution of gelatin, a peroxide catalyst soluble in said vinyl chloride and from 1.0% to 3.0%, based on the weight of said vinyl chloride, of barium lauryl beta-imino dipropionate.

References Cited in the file of this patent
UNITED STATES PATENTS

| | | |
|---|---|---|
| 2,528,469 | Condo et al. | Oct. 31, 1950 |
| 2,686,798 | Gmitter | Aug. 17, 1954 |
| 2,833,754 | Richards et al. | May 6, 1958 |
| 2,872,468 | Leistner et al. | Feb. 3, 1959 |